United States Patent [19]

Hedrick, Jr.

[11] 4,438,147

[45] Mar. 20, 1984

[54] FOAMING CREAMER AND METHOD OF MAKING SAME

[75] Inventor: Paul L. Hedrick, Jr., Plain City, Ohio

[73] Assignee: Societe d'Assistance Technique pour Produits Nestle S.A., Lausanne, Switzerland

[21] Appl. No.: 392,229

[22] Filed: Jun. 25, 1982

[51] Int. Cl.³ .................. A23C 1/04; A23G 1/00; A23L 2/00; A23L 2/40

[52] U.S. Cl. .................. 426/570; 426/585; 426/590; 426/591; 426/593; 426/470; 426/471

[58] Field of Search ............ 426/564, 569, 570, 585, 426/588, 590, 591, 470, 471, 477, 593; 239/469

[56] References Cited

U.S. PATENT DOCUMENTS

| | | | |
|---|---|---|---|
| 2,136,651 | 11/1938 | Fear | 426/593 |
| 2,499,084 | 2/1950 | Bahnson | 239/469 |
| 2,933,393 | 4/1960 | Ortman | 426/588 |
| 3,013,881 | 12/1961 | Carlson et al. | 426/593 |
| 3,064,722 | 11/1962 | Morgan et al. | 426/471 |
| 3,246,992 | 4/1966 | Noznick et al. | 426/564 |
| 3,738,412 | 6/1973 | Nezbed et al. | 426/471 |
| 3,821,436 | 6/1974 | Fry | 426/470 |
| 4,046,926 | 9/1977 | Gardiner | 426/585 |
| 4,242,364 | 12/1980 | Buddemeyer et al. | 426/471 |

*Primary Examiner*—Raymond N. Jones
*Assistant Examiner*—Elizabeth J. Curtin
*Attorney, Agent, or Firm*—Vogt & O'Donnell

[57] ABSTRACT

A powder-form foaming creamer suitable for use in beverages is prepared by spray-drying a mixture containing a non-dairy fat, a non-dairy carbohydrate and a proteinaceous foam stabilizer. In the spray-drying step, the mixture is atomized by forcing it through a narrow orifice under a high pressure. The dried powder withstands severe handling and retains the ability to produce a foam in the final beverage.

30 Claims, No Drawings

FOAMING CREAMER AND METHOD OF MAKING SAME

The present invention relates to creamers or dairy product substitutes useful in preparation of beverages. The present invention also relates to methods of producing such creamers.

Milk or cream in a cocoa beverage provides a desirable creamy texture or "mouth feel" and also makes the beverage lighter in color. Thus, milk or cream is normally used in cocoa beverages prepared according to traditional methods.

Dried skim milk has been incorporated in powdered cocoa mixes heretofore to provide similar properties in the beverage prepared from the powdered mix. The dried skim milk has also been utilized to impart a desirable foaming characteristic to the beverage mix. A gas is incorporated into the skim milk before the skim milk is dried. After drying, the skim milk powder is blended with the other powdered ingredients of the mix and packaged. When the mix is added to hot water, gas is released from the skim milk powder and produces bubbles at the surface of the final beverage, reminiscent of the foam generally present on the surface of cocoa brewed by traditional home methods.

As skim milk is relatively expensive, it would be highly desirable to provide a substitute material or creamer consisting primarily or entirely of ingredients other than skim milk but capable of performing the same functions as gasified skim milk in a powdered cocoa mix or similar product.

The present invention provides creamers which may be utilized as direct substitutes for gasified skim milk in preparation of powdered cocoa mixes and similar products. The present invention also provides methods of making such creamers.

In making a creamer according to the present invention, the non-water ingredients or "solids" to be incorporated in the finished creamer are blended with water to form a liquid mixture. Gas is blended into the mixture, and the mixture is homogenized and spray-dried to form the desired powdered product. The term "solids" is utilized in the present disclosure to denote the non-water ingredients incorporated in the liquid mixture and ultimately preserved in solid form in the combination of ingredients constituting the dried creamer. However, such term should not be understood as limited to particular ingredients which, in their uncombined or pure state, are solid. Amounts of individual solids are stated herein as percentages. Such percentages should be understood as the percentage of the individual solid by weight on a dry basis, i.e., the weight of the individual solid ingredient as a percentage of the total weight of solids in the mixture.

The solids incorporated in the mixture preferably include a non-dairy fat, a water soluble non-dairy carbohydrate and a proteinaceous foam stabilizing agent. The solids may include some dry skim milk powder, and in such case, the foam stabilizing agent incorporated in the mixture would include some of the proteins normally occurring in the skim milk powder. In the preferred embodiments, however, no skim milk powder is incorporated in the liquid mixture or in the final dried product, and another foam stabilizing agent such as, for example, sodium caseinate is utilized. A minor amount of a gum may also be incorporated into the mixture. The ingredients and spray-drying process utilized in the present invention tend to coact with one another so as to promote retention of gas and formation of voids in the spray-dried creamer particles. Such voids are desirable in that gas or air occluded in the voids will be liberated when the creamer is dissolved in water during use, and will produce bubbles in the beverage.

Ordinarily, the non-dairy fat and the non-dairy carbohydrate together constitute the major portion of the solids in the mixture. The fat and carbohydrate ingredients may constitute more than 85% of the solids.

The solids may include from about 5% to about 50% non-dairy fat by weight. Partially hydrogenated vegetable oils having melting points of about 37.8°–43.3° C. are preferred. Such vegetable oils may include cocoanut oil, cottonseed oil, soybean oil, palm oil, palm kernel oil or any other similar vegetable oil which will not adversely affect the taste of the product. Oils having melting points below about 35° F. are less preferred as they may tend to cause caking of the dried creamer.

Generally, the "whitening power" or ability of the creamer to lighten the color of the cocoa beverage increases as the proportion of fat in the mixture increases. The ability of the creamer to impart a creamy texture or "mouth feel" also increases with the proportion of fat in the mixture. Additionally, creamers having higher levels of fat produce a foam with smaller bubbles and a desirable dense appearance. However, because the size of the bubbles tends to decrease with increasing fat content, the volume of foam also tends to decrease at very high fat levels. The preferred range of fat content is between about 20% and about 50%, the range of about 40% to about 50% beng particularly preferred.

Dry skim milk may be included in the mixture. Any dry skim milk utilized in the creamer should preferably be of the type known as "low heat skim milk powder" produced by removing part of the water from liquid skim milk under relatively low temperatures (as by vacuum evaporation) and then drying the remaining concentrate. Increasing the level of skim milk in the mixture tends to improve gas retention in the dried creamer and also tends to improve the stability of the foam in the final beverage. Both effects tend to increase the foaming power of the creamer. However, as skim milk is relatively expensive, and as satisfactory foaming power may be provided without the use of any skim milk, levels of skim milk content below 50% are preferred, levels below about 15% being more preferred and zero skim milk content being most preferred.

The solids should include an effective amount of a foam stabilizer. As used in this disclosure, the term "foam stabilizer" means a substance which, when added to an aqueous mixture, increases the surface tension of the mixture and thus, tends to prevent rupture of bubbles formed in the mixture. The preferred foam stabilizers are proteinaceous materials such as salts of casein, sodium caseinate being most preferred. It is believed that such casein salts also serve to improve gas retention and void formation during the spray drying step. In the final beverage, such casein salts also tend to prevent coalescence of the non-dairy fat and thus tend to prevent formation of an unsightly layer of fat globules on the surface of the beverage.

Sodium caseinate provides the desired effect, in mixtures without any skim milk, at caseinate levels of about 3.5% and higher. The desirable properties imparted by the sodium caseinate are accentuated by the use of greater amounts up to at least about 10%. However, the degree of improvement produced by each unit of added sodium caseinate at levels above about 7.5% is ordinarily minimal. Accordingly, sodium caseinate levels of about 3.5% to about 7.5% are preferred in those embodiments wherein skim milk is not used. As noted above, the proteins contained in skim milk act as foam stabilizers. Accordingly, if substantial amounts of skim milk are utilized, other foam stabilizers may be utilized in lesser amounts or eliminated entirely. Preferably, mixtures incorporating skim milk also incorporate about 2% to about 3% sodium caseinate.

A minor amount of a gum may be incorporated in the mixture. It is especially desirable to use such a gum if no skim milk is present in the mixture. The gum tends to enhance gas retention and void formation during the spray-drying process. It is also believed that the gum physically strengthens the dried creamer particles and thus aids in preventing rupture of the voids during handling and blending. The gum thus serves to improve the foaming power of the dried creamer and serves to retain this foaming power in the finished beverage mix.

The gum also serves to improve the mouth feel of the final product. Cellulosic, hydrocolloid-forming gums are preferred, carboxymethylcellulose gums being particularly suitable. The amount of gum which should be used will vary with the properties of the particular gum employed. Generally, the amount of gum employed should be sufficient to raise the viscosity of the liquid mixture to a level at least about 20%, and preferably about 50% above the viscosity of a similar mixture without the gum. As the mixture is ordinarily a non-Newtonian fluid, the apparent viscosity of the mixture will vary with the method of measurement. One practical method for measuring the viscosity of the mixture is to measure the time required for 9 milliliters of the mixture, at about 50° C., to drain through the orifice of a 10 milliliter disposable pipette of the type supplied by the Corning Glass Company under catalog number 7077, such pipette having an orifice about 0.159 cm in diameter. The time required for such drainage is a measure of the mixture viscosity. As used herein, the term "viscosity" should be understood as referring to the viscosity determined in accordance with this method. Numerical viscosity values stated herein without units should be understood as drainage time in seconds as determined in accordance with this method.

The amount of gum which is incorporated in the mixture should not be so great as to increase the viscosity of the mixture to the point where it cannot be spray-dried. Hydrocolloid-forming gums are advantageous in this regard as they tend to impart pseudoplastic characteristics to the mixture. Thus, a portion of the viscosity increase imparted by such a gum will be temporarily reversed under the relatively high shear rates encountered in the spraying operation. With typical carboxymethylcellulose gums, about 0.1% to about 1.0% gum by weight in the solids may be utilized, about 0.5% being preferred. The mixture (with the gum) may have a viscosity of about 8–12.

Water-soluble carbohydrate acts as a filler and as a carrier for the other ingredients and also serves to reinforce the particle structure of the dried creamer. The carbohydrate content may be between about 30% and about 75% of the solids. Normally, the carbohydrate content in any particular formulation is selected by subtracting the total amount of other solids from 100%. Various water-soluble carbohydrates may be utilized, including sucrose, dextrose, maltose, corn syrup solids and mixtures of these. Corn syrup solids and mixtures of corn syrup solids and sucrose are preferred.

The solids are blended with an amount of water sufficient to provide a liquid mixture of suitable total solids content, preferably between about 48% and about 52% total solids by weight for typical formulations. If a gum is incorporated in the formulation, the gum may be dispersed by dry blending it with a portion of the carbohydrate before adding the carbohydrate to the mixture. The liquid mixture ordinarily has a pH of about 5.8 to about 7, about 7 being preferred.

After mixing, the material may be pasteurized, as by holding it at about 68° C. for about 20 minutes, and then cooled to about 54° C. The cooled mixture is then blended with gas. Inert gasses such as carbon dioxide or nitrogen may be used for this purpose. A product which has been gasified with nitrogen ordinarily has somewhat greater foaming power than that which has been gasified with carbon dioxide. The bulk density of the dried creamer normally varies inversely with the amount of gas blended into the liquid mixture. The amount of gas is normally on the order of about 0.6 kg of gas per 1000 kg of mixture, the particular amount normally being selected to provide a bulk density between about 0.25 gm/cc and about 0.35 gm/cc, preferably between about 0.30 gm/cc and about 0.35 gm/cc.

The gas may be introduced into the liquid mixture as the mixture is pumped through a pipe by injecting the gas under pressure through a suitable orifice in the pipe. The gas may be thoroughly dispersed in the mixture by passing the gas-bearing liquid mixture through an in-line mixer positioned in the pipeline downstream of the gas injection orifice. One suitable type of in-line mixer, known as a static mixer, incorporates a tubular passageway and a plurality of vanes positioned in such a fashion as to repeatedly subdivide and recombine the mixture as it passes through the passageway. To retain the gas in the mixture, the mixture should be maintained under pressure from the gas introduction step until the spray-drying step.

The mixture should also be homogenized, as by forcing the mixture through a narrow orifice. In a piston-type homogenizer, the mixture is pumped through an orifice which is constricted by a plate or plug. As the pumping pressure increases, the degree of homogenization attained in each stage also tends to increase. The homogenization operation may be conducted in multiple stages by passing the mixture through a plurality of such pumping operations in sequence. Multi-stage homogenization, utilizing pressure on the order of 35 to 175 kg/cm$^2$ at each stage, is preferred.

The gas blending step may be performed before or after the homogenization step. The mixture may be pressurized by a "stuffing pump" to about 7 kg/cm$^2$, then passed through the pipeline, past the gas injection orifice and through the in-line mixer to the inlet of the homogenizer. After blending and homogenizing, the mixture is spray-dried by a high pressure spray-drying process. If the outlet of the homogenizer is connected by suitable piping to the inlet of the spray-dryer, the homogenizer may also serve to force the mixture through the spray-drying nozzles.

In high pressure spray-drying, the mixture is forced through a minute orifice under a pressure of at least about 42 kg/cm$^2$. The orifices utilized in this process generally have internal diameters less than about 3.8 mm. Pressures of at least about 140 kg/cm$^2$ and orifice diameters between about 1.5 and about 3.8 mm are preferred in large-scale operations. As the mixture passes through the orifice, it is subjected to extreme shearing conditions. The nozzle is preferably provided with a "core" or "swirl" disposed upstream of the orifice and arranged to impart a swirling motion to the mixture as it enters the orifice. The mixture exits from the orifice in the form of finely atomized droplets, the droplets issuing from the orifice in a conical pattern. A gaseous drying medium such as air of low relative humidity at an elevated temperature is introduced into the spray dryer and contacts the atomized mixture. The present invention incorporates the discovery that drying the aforementioned mixtures by such a high pressure spray-drying process provides certain desirable properties in the finished dried creamer. It has been found that the creamer particles produced by such a process are predominantly in the form of hollow, generally spherical globular bodies.

Such hollow bodies tend to occlude gasses in their interior voids. The gases retained in such voids contribute to the foaming action of the creamer in the final beverage mix. Moreover, hollow globular bodies tend to resist breakage and attrition during handling of the creamer and blending of the creamer with the other ingredients of the cocoa mix. They therefore will retain their desirable void structure through all of the rather severe handling and blending processes which have been used heretofore to incorporate gasified dried skim milk into cocoa mixes. Such handling processes may include a "fluidizing" step wherein the powdery dry skim milk is entrained in a stream of air for transportation within the plant. As creamers according to the present invention retain most of their foaming power even after fluidizing, they may be incorporated into dry cocoa mixes without any substantial change in the cocoa mix production processes.

By constrast, creamers dried by a low pressure spray-drying process do not possess these desirable characteristics to the same degree. In the low pressure spray-drying process, the liquid mixture is discharged from a nozzle under a moderate pressure such as about 2.8 kg/cm$^2$ and then contacted with a blast of gaseous drying medium to atomize the mixture. The low pressure drying process tends to produce non-uniform flake-like particles. These particles tend to be more fragile than the globular particles produced by the high pressure process. Therefore, creamer particles produced by low pressure spray-drying tend to break during handling and blending into the finished cocoa mix. Such particle breakage is believed to be responsible for the distinct loss of foaming ability which can occur when creamers produced by low pressure spray-drying are handled.

In the high-pressure spray-drying operation, one or more spray orifices may be disposed at the top of the drying chamber, and hot air may be blown into the chamber from the top. The atomized mixture falls towards the bottom of the chamber, moving cocurrently with respect to the air. Ordinarily, the temperature of the liquid mixture as it is introduced to the spray nozzles may be about 52° to 66° C., and the temperature of the air blown into the chamber may be on the order of 150°–260° C. Normally, the creamer is dried to a moisture content of less than 3% and preferably about 1% to about 2% in the spray-dryer. As evaporation of water from the mixture cools the droplets, the dried product collected at the bottom of the chamber will ordinarily have a temperature significantly less than the temperature of the air in the dryer. The collected product is preferably cooled to between about 27° C. and about 32° C.

If the dry creamer must flow freely during subsequent handling steps, it is most desirable to add an anti-caking and flow enhancing agent. Some suitable agents are sodium silicoaluminate, tricalcium phosphate and combinations of these substances. Such agents may be dry-blended with the creamer at a level of about 0.1 to 1.0 parts per 100 parts dried creamer. The creamer may then be sifted to screen out particles larger than about 1.2 mm.

The dried product should be capable of providing the desired amount of foam in the final cocoa beverage. Foaming power can be measured by the following procedure:

1. Mix 15 grams of fine granulated common sugar with 5 grams of the creamer.
2. Add the mixed creamer and sugar to 140 ml of water at 82° C. in a 250 ml beaker and stir gently for 15 seconds using a teaspoon.
3. Pour the mixture gently down the side of a standard 250 ml graduated cylinder.
4. Allow the mixture to stand in the cylinder for 3 minutes, then measure the volume of the foam layer. The volume of the foam layer determined in this fashion is the "foam index" of the creamer. A creamer for use in a cocoa beverage should ordinarily have a foam index between about 4 and about 8.

A creamer according to the present invention normally does not contain any surface tension reducing agents or surfactants. Surfactants such as, e.g., lecithin are normally employed as emulsifiers in creamers for use in coffee or tea. They enhance dispersion of the creamer fats in the beverage and hence enhance the opacity of the beverage. However, it has been found that such surfactants markedly reduce the foaming power of the creamer. Moreover, it has been found that such agents are unnecessary in a creamer according to the present invention, especially if the creamer is utilized in a naturally opaque cocoa beverage.

The following examples illustrate certain embodiments of the present invention.

EXAMPLE 1

A mixture containing the following solids was prepared:

| Ingredient | Percent by Weight Dry Basis |
|---|---|
| Vegetable Oil (43.3° C. M.P.) | 43.62 |
| Sucrose | 25.63 |
| Corn Syrup Solids (24 Dextrose Equivalent) | 23.22 |
| Sodium Caseinate | 7.03 |
| Carboxymethylcellulose Gum (Type 9M31XF, Hercules Incorporated) | .50 |
| | 100.00 |

The liquid mixture contained 50% total solids by weight. It had a viscosity of about 11. By contrast, the same mixture without the gum had a viscosity of about 7–8. After mixing, pasteurization and cooling to about 54.4° C., the mixture (with gum) was pumped through a pipe under about 7.03 kg/cm$^2$ pressure at a flow rate of about 5080 kg/hr. Carbon dioxide was injected into the flowing mixture, and the gasified mixture was passed through a static mixer to the inlet of the homogenizer. It was homogenized at about 141 kg/cm$^2$ homogenization pressure, and then passed directly to the spray-dryer, a pressure of about 422 kg/cm² being maintained at the inlets to the spray-drying nozzles.

Three nozzles of the type sold by Spraying Systems Co. of Wheaton, Ill. were mounted adjacent the top of the drying chamber. Each nozzle had a No. 28 core and a No. 40 orifice plate (manufacturer's designation), the orifice plate having one 2.5 mm inch diameter orifice. Each nozzle was arranged to discharge droplets of mixture in a conical pattern of about 77° included angle. The spray drying conditions were as follows:

| | |
|---|---|
| Mixture Temperature at Nozzle Inlets | 54.4° C. |
| Approximate Dryer Air Flow | 1560 cubic meters per minute |
| Inlet Air Temperature | 263° C. |
| Exhaust Air Temperature | 83° C. |
| Product Rate | 2540 kg/hr |
| Product Moisture | 1.5% |

The dried creamer was collected and blended with sodium silicoaluminate, about 0.5 parts sodium silicoaluminate being used per 100 parts dried creamer. After sifting to exclude particles larger than about 1.2 mm, the creamer had a bulk density of about 0.31–0.33 gm/cc, and a foam index of about 4.

EXAMPLE 2

The same mixture as used in Example 1 was gasified and homogenized by the procedure of such example, but spray-dried in a dryer equipped with three nozzles, each having a Spraying Systems No. 32 core and No. 50 orifice plate with one 1.78 mm diameter orifice. A pressure of about 450 kg/cm² was maintained at the inlets to the nozzles. The spray drying conditions were as follows:

| | |
|---|---|
| Mixture Temperature at Nozzle Inlets | 54.4° C. |
| Approximate Dryer Air Flow | 708 cubic meters per minute |
| Inlet Air Temperature | 207° C. |
| Exhaust Air Temperature | 82° C. |
| Product Rate | 1360–1450 kg/hr |
| Product Moisture | 1.4%–1.7% |

After blending with sodium silicoaluminate and sifting as in Example 1, the dried creamer had a bulk density of 0.30–0.35 gm/cc and a foam index of 6–8.

A powdered cocoa beverage was prepared by dry-blending the creamer with other ingredients as follows:

| Ingredient | Percent by Weight, Dry Basis (Approximate) |
|---|---|
| Creamer | 15 |
| Granulated Common Sugar | 58 |
| Skim Milk Powder | 10 |
| Sweet Whey | 8 |
| Dutched Cocoa | 7.5 |
| Carboxymethylcellulose Gum | 0.7 |
| Salt | 0.6 |
| Ethyl Vanillin | 0.03 |

The creamer was fluidized by entraining it in a stream of air for loading into the blending apparatus. The mixture, when reconstituted with hot water, provided a cocoa beverage having foamy appearance, taste and mouth feel equivalent to those provided by conventional instant cocoa mixes incorporating gasified dry skim milk.

EXAMPLE 3

A mixture incorporating about 50.82% solids was prepared. The solid components were as follows:

| Ingredient | Percent by Weight Dry Basis |
|---|---|
| Corn Syrup Solids (36 Dextrose Equivalent) | 51.547 |
| Partially Hydrogenated Vegetable Oil (43.3° C. M.P.) | 41.388 |
| Sodium Caseinate | 3.894 |
| Maltodextrin | 2.681 |
| Carboxymethylcellulose Gum, Type 9M31XF | 0.489 |

The gum was dry blended with the maltodextrin before the maltodextrin was added to the mixture. The mixture had a viscosity of 9.4. The same mixture, without the gum, had a viscosity of 6–7. The mixture (with gum) was pasteurized and homogenized by passing it through two two-stage homogenizers in sequence. The homogenization pressures (kg/cm²) were as follows:

| | First Stage | Second Stage |
|---|---|---|
| First Homogenizer | 0 | 35 |
| Second Homogenizer | 175 | 35 |

After homogenization, the mixture was blended with nitrogen, at a level of about 0.625 kg of nitrogen per 1000 kg of mixture. After the nitrogen was dispersed in the mixture by a static mixer, the gasified mixture was spray-dried. The spray-dryer was equipped with one nozzle (Delavan Co., West Des Moines, Iowa, type SDX) having a type SE swirl (manufacturer's designation) and a 3.35 mm diameter orifice. The nozzle was mounted adjacent the top of the chamber and arranged to discharge droplets of mixture in a conical pattern of about 85° included angle. A spray pressure of about 169 kg/cm² was applied to force the mixture through the nozzle, and hot air was admitted to the chamber at the top. The spray drying conditions were as follows:

| | |
|---|---|
| Temperature of Air at Inlet | 266° C. |
| Chamber Temperature | 110° C. |
| Exhaust Air Temperature (Dry Bulb) | 104° C. |
| Exhaust Air Temperature (Wet Bulb) | 50° C. |
| Mixture Temperature at Inlet to Nozzle | 54.4° C. |
| Product Rate | 590 kg/hr |
| Product Moisture | 1.0% |

The dried product was blended with about 0.5 parts sodium silicoaluminate and about 0.3 parts tricalcium phosphate and then sifted as in Example 1. The finished product had a bulk density of between 0.25 gm/cc and 0.30 gm/cc, and a foam index of about 4.

EXAMPLE 4

The mixture of Example 3 was blended, homogenized and gasified in a similar manner, but spray-dried in a smaller dryer at a product rate of about 23–27 kg/hr. The dryer had one Delavan "Mini SDX" nozzle with a No. 1 swirl (manufacturer's designation) and a 0.69 mm diameter orifice. A mixture pressure of about 70 kg/cm² was used. Drying air was supplied at about 45 cubic meters per minute and at about 163° C., the air being discharged from the dryer at about 85° C. The dried product was similar to that produced in Example 3.

EXAMPLE 5

A mixture of about 50% solids and about 50% water was made using the following solids:

| Ingredient | Percent by Weight Dry Basis |
|---|---|
| Corn Syrup Solids (36 Dextrose Equivalent) | 32.079 |
| Partially Hydrogenated Vegetable Oil (43.3° C. M.P.) | 25.520 |
| Low Heat Skim Milk Powder | 40.001 |
| Sodium Caseinate | 2.400 |
| | 100.00 |

This mixture was processed as in Example 3 and the dried product was blended with anticaking and flow enhancing agents as set forth in such example. The resulting finished creamer had a bulk density of between 0.25 gm/cc and 0.30 gm/cc and a foam index of about 7-8.

EXAMPLE 6

Several mixtures were prepared and processed under the same conditions, such conditions being generally similar to those employed in Example 4. All of the mixtures contained 50% total solids, the solids including 5% sodium caseinate and 10% skim milk (dry basis). All of the mixtures contained corn syrup solids and coconut oil in differing amounts, as set forth below. The foam index and bulk density of the dried creamer produced from each mixture are also set forth below.

| Mixture | % Coconut Oil (Dry Basis) | % Corn Syrup Solids (Dry Basis) | Foam Index | Bulk Density gm/cc |
|---|---|---|---|---|
| A | 40 | 45 | 4 | 0.40 |
| B | 35 | 50 | 4 | 0.41 |
| C | 30 | 55 | 4-5 | 0.40 |
| D | 25 | 60 | 4-5 | 0.45 |
| E | 20 | 65 | 6 | 0.35 |
| F | 15 | 70 | 4-5 | 0.35 |
| G | 10 | 75 | 4 | 0.36 |
| H | 5 | 80 | 2-3 | 0.41 |

EXAMPLE 7

A mixture containing the following solids was prepared:

| Ingredient | Percent Dry Basis |
|---|---|
| Vegetable Oil (43.3° C. M.P.) | 20 |
| Corn Syrup Solids | 45 |
| Skim Milk Powder | 30 |
| Sodium Caseinate | 5 |

The liquid mixture contained about 50% total solids. A portion of this mixture was processed under conditions similar to those employed in Example 3, with a similar high-pressure spray-drying step. The resulting creamer had a foam index of 6. This creamer was subjected to a simulated industrial handling operation by working it with a mortar and pestle. After this treatment, the creamer had a foam index of 4-5.

Another portion of the same liquid mixture was processed under the same conditions, except that this portion was spray-dried using a low-pressure spray technique wherein the mixture was discharged through orifices under a pressure of about 2.8 kg/cm$^2$ and atomized by a blast of air. The creamer made in this fashion also had a foam index of 6. However, after the same simulated industrial handling operation as described above, the foam index of this creamer decreased to 3.

What is claimed is:

1. A method of making a foaming creamer comprising:
   (a) forming a liquid mixture comprising water and solids, said mixture being devoid of an effective amount of surface tension reducing agents, said solids including at least about 5% non-dairy fat, at least about 30% water-soluble non-dairy carbohydrate, and between 0% and about 50% dry skim milk, there being present in said solids an effective amount of a proteinaceous foam stabilizer;
   (b) blending an inert gas to gassify said mixture;
   (c) homogenizing said mixture; and
   (d) spray-drying said mixture, after said gas-blending and homogenizing steps, by:
      (1) forcing the mixture through an orifice under a spray pressure sufficient to finely atomize the mixture, and
      (2) contacting the atomized mixture with a gaseous drying medium at an elevated temperature, to thereby produce a substantially dry powder devoid of an effective amount of surface tension reducing agents.

2. A method as claimed in claim 1 in which said non-dairy fat and said non-dairy carbohydrate together constitute at least about 85% of said solids.

3. A method as claimed in claim 2 in which said carbohydrate constitutes less than about 75% of said solids.

4. A method as claimed in claim 3 in which said fat constitutes at least about 20% of said solids.

5. A method as claimed in claim 4 in which said fat constitutes less than about 50% of said solids.

6. A method as claimed in claim 5 in which said solids include at least about 2% of a casein salt, said casein salt constituting at least a portion of said proteinaceous foam stabilizer.

7. A method as claimed in claim 6 in which no skim milk is included in said solids and said casein salt constitutes at least about 3.5% of said solids.

8. A method as claimed in claim 7 in which said solids include a gum in an amount sufficient to impart to said mixture a viscosity increase of at least 20%.

9. A method as claimed in claim 8 in which said casein salt is sodium caseinate.

10. A method as claimed in claim 8 in which said solids constitute between about 48% and about 52% of said mixture by weight.

11. A method as claimed in claim 8 in which said gum is a cellulosic gum, said cellulosic gum constituting between about 0.1% and about 1.0% of said solids.

12. A method as claimed in claim 11 in which said cellulosic gum constitutes about 0.5% of said solids.

13. A method as claimed in claim 12 in which said gum is a carboxymethylcellulose gum.

14. A method of making a foaming creamer comprising:
   (a) forming a liquid mixture comprising water and solids, said mixture being devoid of an effective amount of surface tension reducing agents, said solids including at least about 5% non-dairy fat, at least about 30% water-soluble non-dairy carbohydrate, and between 0% and about 50% dry skim milk, there being present in said solids an effective amount of a proteinaceous foam stabilizer;

(b) blending an inert gas to gassify said mixture;

(c) homogenizing said mixture; and (d) spray-drying said mixture, after said gas-blending and homogenizing steps, by:

(1) forcing the mixture through an orifice less than about 3.8 mm. in diameter under a spray pressure of at least about 42 kg/cm$^2$, and (2) contacting the atomized mixture with a gaseous drying medium at an elevated temperature, to thereby produce a substantially dry powder devoid of an effective amount of surface tension reducing agents.

15. A method as claimed in claim 14 in which said spray pressure is at least about 140 kg/cm$^2$ and said orifice is between about 1.5 mm and about 3.8 mm in diameter.

16. A method as claimed in claim 14 in which a swirling motion is imparted to said mixture as said mixture is forced through said orifice.

17. A method as claimed in claim 1 in which said gas blending step includes the step of introducing the gas into the mixture while maintaining the mixture under a superatmospheric pressure.

18. A method as claimed in claim 17 in which said mixture is maintained under superatmospheric pressure from said gas-introducing step to said spray-drying step.

19. A method as claimed in claim 18 in which said gas blending step includes the step of dispersing said gas in said mixture after said gas-introducing step.

20. A method as claimed in claim 19 in which said gas blending step is performed prior to said homogenizing step.

21. A method as claimed in claim 1 in which the amount of said gas blended with said mixture is selected to provide a dried powder having a bulk density between about 0.30 and about 0.35 grams/cc.

22. A method as claimed in claim 1 in which said gas is selected from the group consisting of carbon dioxide and nitrogen.

23. A method as claimed in claim 22 in which said gas is nitrogen.

24. A method as claimed in claim 1 in which said skim milk constitutes at least about 10% of said solids.

25. A method as claimed in claim 24 in which said skim milk constitutes between about 35% and about 45% of said solids.

26. A method as claimed in claim 14 further comprising the step of blending a flow enhancing agent with the dry creamer resulting from said spray-drying step.

27. A method of making a beverage mix comprising making a creamer by a method as claimed in claim 26, then fluidizing the creamer and mixing the fluidized creamer with a beverage powder.

28. A creamer made by a method as claimed in claim 1 or claim 2 or claim 6 or claim 7 or claim 8, the creamer having a foam index of at least about 4.

29. A creamer as claimed in claim 28 in which said foam index is between about 4 and about 8.

30. A creamer as claimed in claim 29 having a bulk density between about 0.30 gm/cc and about 0.35 gm/cc.

* * * * *